Figure 1:
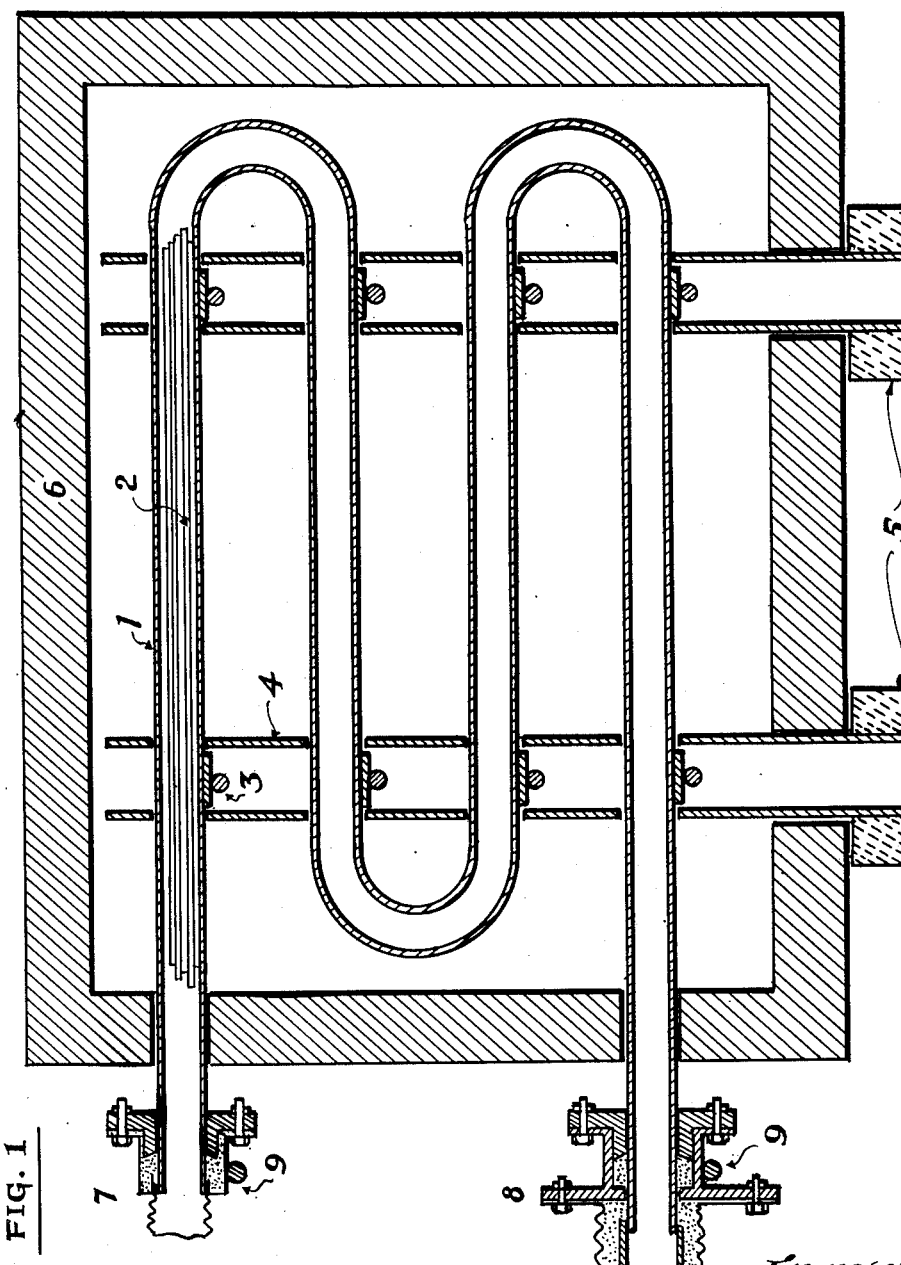

Sept. 15, 1953  E. D. LEWIS ET AL  2,652,037
HEAT EXCHANGE APPARATUS
Filed Sept. 3, 1947  2 Sheets-Sheet 1

Inventors
ERNEST D. LEWIS &
RICHARD M. LUCKRING
BY Robert M. McKinney
AGENT

Sept. 15, 1953      E. D. LEWIS ET AL      2,652,037
HEAT EXCHANGE APPARATUS

Filed Sept. 3, 1947      2 Sheets-Sheet 2

Inventors
ERNEST D. LEWIS &
RICHARD M. LUCKRING
BY Robert M. McKinney
AGENT

Patented Sept. 15, 1953

2,652,037

UNITED STATES PATENT OFFICE 2,652,037

HEAT EXCHANGE APPARATUS

Ernest D. Lewis and Richard M. Luckring, Wilmington, Del., assignors to E. I. du Pont de Nemours & Company, Wilmington, Del., a corporation of Delaware Application September 3, 1947, Serial No. 771,866

3 Claims. (Cl. 122—510)

This invention relates to a heat exchange apparatus for treating fluids, and particularly to an apparatus for heating corrosive fluids to high temperatures.

In certain processes, it is necessary to carry out heat exchange operations on fluids at temperatures which preclude the use of metal heat exchangers. Various types of refractory heat exchangers have been employed, particularly for heating and cooling furnace gases in the steel industry. Examples are firebrick regenerators, silicon carbide recuperators, fireclay and brick recuperators, and many other variations. These are fairly satisfactory in the recuperation of waste heat from furnace gases, but their tendency to develop cracks makes them useless in most chemical processes, where leakage cannot be tolerated. Furthermore, the materials of which they are constructed are subject to attack by many common chemicals, particularly at high temperatures, and even a slow rate of chemical attack may result in undesirable contamination of the substances being handled. Fused silica heat exchangers have been used extensively in laboratory equipment and in some acid concentration and condensation applications on commercial scale. The latter equipment operate at moderate temperatures with the various silica parts connected together by packed and cemented joints. The fragility and porosity of these joints preclude extensive application of these exchangers to high temperature operations. A small leak of a corrosive fluid through the packed joint usually tends to grow progressively worse because of corrosion and erosion of the packing material. Also these cements usually contain binding agents which are subject to attack by corrosive fluids at high temperatures and which may introduce undesirable contamination of the substance being handled. As a consequence, the development of certain chemical processes has been retarded by the difficulty of carrying out the required heat exchange operations on a commercial scale, and other processes are very much more costly than they should be.

It is an object of this invention, therefore, to provide a heat exchange apparatus for use with fluids at high temperatures. A further object is the provision of a heat exchange apparatus for use with corrosive fluids. A further object is the provision of a refractory heat exchange apparatus which is comparatively free from a tendency to develop leaks. A still further object is the provision of a silica heat exchange apparatus for use in treating fluids on a commercial scale. A particular object of the invention is the provision of an apparatus for heating titanium tetrachloride.

Our invention comprises a heat exchange apparatus which consists of continuous fused silica conduits, with accessory devices for the increase of heat transfer efficiency, supported on refractory bearings and connected to inlet and/or outlet conduits with flexible joints, in such a way that the thermal expansion and contraction of the silica does not set up appreciable stresses in the silica conduits, and external vibrations, shocks, and stresses are not transmitted to the silica conduits. A particular embodiment of this invention is an apparatus for the heating of titanium tetrachloride which comprises fused silica conduits enclosing devices for the promotion of heat transfer, supported on fused silica columns by means of silica rollers to permit horizontal movement of the conduits, and flexibly connected to inlet and/or outlet conduits leading to other equipment.

It is well known that fused silica has a very low co-efficient of thermal expansion. In large scale equipment, however, even this small amount of expansion must be compensated for, because of the fragility of the material. Prior large scale silica equipment has generally been constructed with packed and cemented bell-and-spigot joints between silica sections, in much the same manner as cast iron or ceramic piping is handled. Welded joints are far more satisfactory from the standpoint of permanence and impermeability, and in some cases are the only type joint which can be used. However, their rigidity means that all stresses are transmitted through them, and their fragility, because of the difficulty of welding large silica pieces, makes them vulnerable spots. The use of conduit supporting members which eliminate the introduction and communication of both internal and external stresses constitutes an important element of this invention. Any silica equipment has low tensile strength and low impact resistance; hence it cannot stand stresses from static load, mechanical shock, and vibration. Nevertheless, it will be found that, by strict adherence to our invention, a satisfactory fused silica heat exchanger can be constructed.

The invention will be more readily understood by reference to the accompanying drawings, which demonstrate one method of applying it to the problem of heating corrosive gases. Figure 1 shows a four-pass silica preheater, arranged vertically, and heated by a gas-fired furnace.

Conduit 1, carrying the gases to be heated, is a continuous silica tube, formed by welding together various sections of the desired shapes. Straight sections of the conduit contain devices to increase the rate of heat transfer, which are represented in this drawing by bundles of small silica tubes 2. The conduit rests on silica roller bearings 3, and is supported by silica columns 4, as shown more fully in Figures 2 and 3. These columns are given stability by being cemented into refractory blocks 5. The whole is enclosed in a brick furnace 6, provided with suitable heating means. Inlet and outlet ends of the conduit 1 are attached, outside the furnace, to other apparatus by the flexible connections 7 and 8, supported by bearings 9. Here the upper connection 7 is at the cold end of the heater, and requires only a comparatively simple connection to a flexible metal tube. The lower connection 8, however, is in contact with the heated vapors, and a more complicated device is required. Both of these joints are supported on roller bearings 9, so that some horizontal movement of the silica conduit is permitted, but the weight of the joints puts no strain on the silica.

Figure 2:
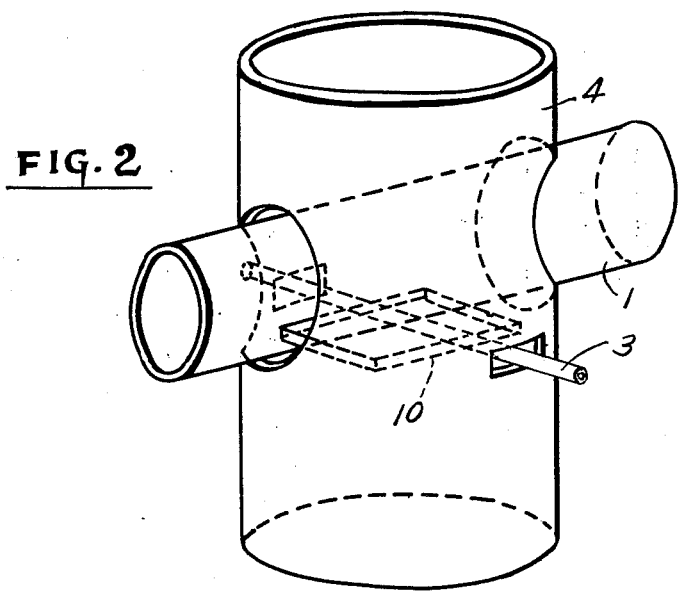
Figure 3:
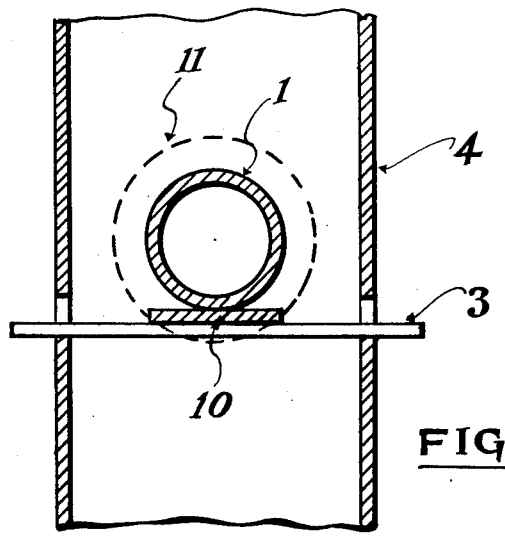

Figures 2 and 3 show the method of supporting the vapor-carrying conduits in this heater. The conduit 1 passes through holes 11, of somewhat larger diameter than the conduit, cut in the silica column 4. A silica rod 3 rests on the lower edges of slots cut in the column 4, in such a way that it can roll back and forth a short distance, acting as a roller bearing. A plate 10 rests on the roller and in turn supports the silica conduit. This plate serves to distribute the load over considerable lengths of both the conduit and the roller, so as to prevent excessive strain at the points of contact. For the sake of simplicity, only one roller was shown here, although more can of course be used.

In processes requiring the exchange of heat between gases, it is frequently necessary to use apparatus constructed of refractory materials, instead of the metals usually employed for heat exchanger construction, because of high temperatures or the corrosive nature of the gases being processed. The low thermal conductivity of most refractories makes these exchangers relatively inefficient, but their principal handicap is the fact that the fragility and difficulty of fabrication of refractory materials in general prohibits the use of the devices for expediting heat transfer commonly employed in metal heat exchangers, such as a multiplicity of small, thin-walled tubes, finned tubes, needle fin tubes, and similar apparatus. In order to promote heat transfer, refractory heat exchanger tubes are frequently packed with granular material, or, in an improved device as herein described, are provided with silica, fireclay, or other refractory "corebusters," or fillers, of star cross-shaped cross-section. These function in two ways. First, the increased gas velocity imparted by the reduced cross-sectional area of free space in the tube has been found to decrease the thickness of the insulating static gas layer at the tube surface. Second, the tube filler is heated by radiation, so that heat is transferred to the gas by its surface at a rate nearly equal to that which would be provided by an equivalent amount of exterior tube surface. At temperatures where radiation is the principal means of heat transfer, the star-shaped packing is by far the most efficient, since all of its surface is in full view of the radiating tube walls, and thus attains the highest temperature possible. Furthermore, it will be apparent that the most efficient shape will be a star with a maximum number of fins, and that maximum will be determined by the thinness of the fins. Unfortunately, ordinary refractories are too delicate to be made thin and the molding process used for their fabrication prohibits complex shapes; as a result the usual corebuster has only four fins, and its cross-section is a stubby cross. Furthermore, many heat transfer operations using corrosive gases now require the use of even less effective granular or fragmented packings, because star-shaped corebusters made of sufficiently resistant materials have not previously been practicable.

Simple shapes of fused silica are commonly made by extrusion of the silica from a softened ingot. Other pieces are made by imbedding a carbon rod in pure silica sand, and heating the rod electrically until the desired thickness of fused silica has formed around it by coalescence of the sand particles. The thick tube thus formed is further shaped by drawing, or by blowing the tube in a mold of the desired shape. The extrusion process is of course satisfactory only for small rods, bars, tubes, and strips; while the articles fabricated by blowing into molds are in general limited to simple hollow vessels and tubes. Furthermore, these must be articles which will be used in appreciable numbers, since the building of special molds and dies is difficult and expensive. Complex shapes, and one-of-a-kind articles, must therefore be made by hand working and welding together of component parts. This is slow and costly; moreover it is extremely difficult to weld pieces without setting up thermal stresses, and causing the entire article to crack.

A visualization of the benefits to be gained by the use of the preferred type of silica star-packing may be obtained by calculations on a simplified case.

These calculations are, of course, merely suggestive, since a number of factors, such as the emissivity of the materials being compared, the nature of their surfaces, the temperature levels used, and others which must be considered in the prediction of actual requirements for heat transfer equipment, had to be omitted for the sake of simplicity.

A silica tube star packing is designed for use in a refractory heat exchanger tube having an inside diameter of 4 in. The packing has eight fins, each $\frac{3}{16}$ in. thick, and 1.25 inches long from the point where it joins the core to its outer edge. The core itself has an outside diameter of 1½ in., and a ⅝ in. diameter axial hole.

The cross-sectional area of the tube is 12.6 sq. in., and that of the star packing 3.34 sq. in., so that the resulting free area in the tube is 9.26 sq. in. with constant mass flow rate, the film coefficient of heat transfer varies inversely with the 0.8 power of the net cross-sectional area; so that the film coefficient for the packed tube is increased approximately as follows:

$$h_2 = h_1 \left(\frac{12.6}{9.26}\right)^{0.8}$$

$$h_2 = 1.28 h_1$$

In other words, the rate of heat transfer through the static gas film covering a given area of heat exchange surface is increased by about 28%.

A four-finned fireclay corebuster of the usual design, and with the same cross-sectional area as the silica packing described above, will of course have the same beneficial effect on film coefficient. However, the additional radiating surface provided will be considerably smaller than that provided by the silica packing. Assuming, for ease of calculation, that each are of the fireclay cross is as wide as it is long, a corebuster of 3.34 sq. in. cross-section will have arms 0.82 in. long and 0.82 in. wide, with a total surface of 9.85 sq. in. for each inch of heat exchanger tube length. The eight-finned silica packing, however, has a total surface (excluding the inner wall of the core, since it does not receive direct radiation from the tube walls) of 24.7 sq. in. for each inch of heat exchanger tube length. Total radiating surface in an unpacked 4 in. tube will be 12.6 sq. in. per inch of length, with the fireclay corebuster it will be 22.4 sq. in. per inch of length, while with the eighth-finned silica star it will be 37.4 sq. in. per inch of length. Thus, in an application requiring 100 ft. of the plain tubing to provide sufficient heat transfer, the same area of radiating surface may be provided by using 56 ft. of tubing with corebuster, or by using only 34 ft. of tubing with the silica packing. This does not take into account the advantage gained in the packed tubes by the increased film coefficient.

A multitude of variations of our invention are possible. Individual design will depend on the particular application, since the nature of the fluid being treated, the temperature levels used, the amount of heat which is to be transferred, the quantity of fluid which must be handled, the type of equipment to be attached at each end of the heat transfer conduit, and many other factors, will determine the most efficient design. Requirements for treating gases will be different from those for treating liquids. Heating may be accomplished by gas burners, electrical heaters, or other well-known devices; while either liquid or gaseous coolants may be employed where a lowering of temperature is desired. In some cases, it will be desirable to introduce a substance in the liquid state, vaporize it, and heat it as a gas, while in others a condensation operation will be desired. Accessory sections for performing these and other operations can of course be introduced without changing the basic design of the apparatus constructed according to our invention. Some suggested specific variations in design are given below.

A specific embodiment of our invention is illustrated by a preheater constructed for the purpose of heating vaporous titanium tetrachloride. This chemical presented a severe corrosion problem relative to materials of construction for use in the preheater. Also conditions of temperature, purity and prevention of contact between the vapor and combustion gas products placed strenuous limitations on conventional type preheaters. High temperature corrosion tests indicated that these metals were unsuitable: iron, steel, stainless steel, platinum, nickel and high nickel alloys. Considerable attack and undesirable contamination were evidenced. Further tests on many refractory materials among which were porcelain, zircon, clay bodies, alumina, silica, magnesia, and Carborundum provided the chemical suitability of silica and showed contamination and attack with all the other materials tested.

A silica preheater was constructed and successfully operated under design conditions heating 1,190 lbs. of titanium tetrachloride per hour from about 137° C. entrance temperature to 950° C. exit temperature. In construction, the preheater was similar to that pictured in Figure 1. It had four passes of 4 inch inside diameter by 10 ft. long silica tubes welded and joined together with three return bends welded from silica elbows. The straight sections of the conduit contained the silica star packing having 8 fins each $\frac{3}{16}$" thick and 1.25 inches long from the outside diameter of the 1½" diameter core. Each conduit rested on four 3 x 4 inch rectangular silica plates which contacted four, one inch diameter silica rods used as roller bearings. The silica rod bearings were supported by four columns, silica tubes 9 inches in diameter and about 6 ft. tall each containing four 6 inch diameter holes for the conduits and four slots to support and guide the silica rods. These columns were cemented into refractory blocks supported outside the furnace on a steel channel beam. The outlet or hot end of the preheater was firmly silica welded to another piece of equipment. The cooler inlet or top bank was connected outside of the enclosing furnace to a two foot section of 2 inch diameter flexible metal hose by means of a metal to silica stuffing box using a powder packing. The metal joint was supported on metal rollers so that movement of the joint was permitted without strain being developed in the silica conduit. The silica conduits and supporting members were enclosed in a gas-fired furnace split vertically, along the center line of the silica tubes, so as to roll away and expose the preheater tubes for easy assembly and inspection.

The apparatus shown in Figure 1 has horizontal tubes arranged in a single vertical plane for convenience in a particular operation. The direction of the conduits does not, in the majority of applications, affect the rate of heat transfer, and they may be arranged horizontally, vertically, diagonally, or in any combination desired. Horizontal passes will ordinarily be preferred because they are easier to support. The number of passes will depend on space limitations and the conduit length required, and in some operations only one pass will be needed.

The method of supporting the heat exchanger will depend chiefly on the arrangement of tubes used. In some arrangements, particularly where all the conduits are in the same horizontal plane, brick piers, ledges, or shelves will be satisfactory. Also water-cooled heat resistance metal supports may be used, with external insulation on the metal to reduce the amount of heat loss. The supports should, of course, be steady. In some cases it will be necessary to provide vibration dampers under the supports, so that vibrations in a building, for example, are not transmitted to the silica apparatus. The critical factor in the design of these supports is that longitudinal movement of the silica conduits, without appreciable strain on the silica, must be permitted. If a large conduit is laid directly on a firebrick shelf, for example, the sliding frictional coefficient is so high that, as the conduit and shelf expand and contract on heating and cooling, considerable force must be exerted on the silica before it will move along the shelf to compensate for the differential expansion or contraction of the two materials. Fused silica will withstand appreciable compression but its tensile strength is low, and tension caused by expansion acting against the inertia due to friction is a common cause of failure in large silica apparatus. Furthermore, one end of a heat-exchange conduit is hotter than the other. In an apparatus such as the one shown in Figure 1, for example, the top pass will be relatively cool, and therefore will expand very little. This expansion can be taken care of by the flexible connection outside the furnace. The next pass will expand a little more. Since the connecting bend between the first and second passes has remained stationary, the next bend must move toward the furnace wall to allow the second pass to expand, and so on down the line. Unless this lateral movement can take place easily, tremendous forces build up. If these were only compressional the silica might withstand them, but the fact that each pass is expanding less than the one below, and more than the one above, means that a torque is applied to the bends between, and this is one type of stress which fused silica will not withstand. Bearings are required, then, and individual design will be determined by the weight supported, the smoothness of surfaces, the length of conduit supported, temperature differentials, and many other factors. The design may be adapted from any of the known types of anti-friction bearings. Roller bearings will probably be easiest to use. The inclusion with the bearing of some type of load distributor, such as the plate shown in Figures 2 and 3, is advisable in most cases, unless a large number of bearings is used. In the design shown in Figures 2 and 3, each roller bearing acts also as a spring, giving additional protection against shock. Supports and bearings may be constructed of any material which will withstand the conditions of service. In a cooling device, where the supports are not exposed to high temperature or corrosive chemicals, metals might even be used. Silica columns were used in the device illustrated chiefly to minimize strains in the vertically arranged silica conduit. Although the silica columns and the conduit are not at exactly the same temperature they expand and contract at almost the same rate, and therefore no strain occurs in the vertical sections of the conduit on repeated heating and cooling. Where all of the heat exchange conduit is in one horizontal plane, the material of which the support is constructed is of less importance. However, in multiple-pass horizontal exchangers, it will usually be necessary to provide bearings which permit movement in any horizontal direction, since expansion and contraction are not limited to a single direction. This is easily accomplished by the use of ball bearings, or two sets of roller bearings superimposed, at right angles to each other.

Design of the connections to other apparatus will depend on the conditions of service, particularly temperatures and the chemical nature of the fluids handled. In many cases a rubber or plastic hose will be adequate for the cold end. Silica is frequently connected to glass or metals by the use of ground joints, such as ball and socket joints, or taper ground joints. The familiar bell and spigot arrangement, with packing and cement, is another alternative. With rigid connections, however, a flexible section should be provided close to one of the joints. Metal bellows, flexible tubing, a coil of metal tubing or "pigtail," and other similar devices will serve. If pressure on the fluid is appreciable, however, a bellows will expand and push against the attached conduit.

The heat exchange conduit is packed with devices for the promotion of heat transfer chiefly because this permits the use of a very much shorter conduit to accomplish the same result. At temperatures where heat transfer by radiation is of secondary importance, it may be preferable to use a simple granular packing, or a filling of bundles of rods or tubes, because they are comparatively inexpensive. These promote heat transfer chiefly by increasing the mass velocity of the flowing fluid, and thereby reducing the thickness of the insulating static fluid film on the heat transfer surfaces. Heat transfer by radiation is promoted to some extent by the added surface, although much of it is too well shielded to be very effective. Where radiation is the prime mechanism of heat transfer, a star-shaped packing is preferred. In such applications, increased efficiency may be obtained by using silica star corebusters which have high absorbability for radiant heat energy. This type of silica corebuster may be fabricated using the method herein described except that a silica sand raw material containing a minor amount of a coloring agent, i. e., titanium dioxide, is used. During the fabrication heating operation partial reduction takes place and the resulting article is colored, in the case using titanium dioxide to a dark purple to black. Increased heat transfer efficiency is then obtained by the use of this colored silica material because of the greater absorbability for radiant heat as compared to the ordinary type of fused silica which has low absorption for radiant heat energy. In some conditions of service, less durable materials are suitable for the packing, and fireclay cores or other similar devices can be used.

Our invention will be useful in a wide variety of processes. Fused silica can be used at temperatures up to 1150° C., and, if it is not cooled down again, up to 1500° C. Chemicals which can be handled are all acids (except hydrofluoric, and at high temperatures, phosphoric acids), halogens except fluorine, some alkali solutions, molten metals, and many others. In addition to being itself highly resistant, fused silica is comparatively free from impurities which might be leached out to contaminate the fluids handled. Even if minor quantities of the silica itself are dissolved, its chemical nature is such that usually no adverse effect on the quality of the chemicals being handled will result. Furthermore, silica is impervious, and when fabricated with welded joints it gives no opportunity for leaks either into or out of the system. Silica's resistance to thermal shock permits much more rapid heating and cooling than is possible with other glasses and ceramic materials.

The many advantages of our invention are by now apparent. The use of silica as a principal material of construction in this heat exchanger permits its application to a wide variety of processes handling corrosive chemicals at extremely high temperatures. Through the use of our invention, processes which formerly were uneconomical or even inoperable can be carried out without difficulty on an industrial scale.

We claim:

1. A support element enabling horizontal movement of a fused silica conduit employed in a furnace for heating corrosive fluids to elevated temperatures comprising in combination an elongated roller-bearing member mounted for restricted movement in a tubular support column, and a load distributing plate member disposed within said column and carried by said bearing member and upon which plate member said fused silica conduit rests.

2. A support element enabling horizontal movement of a fused silica conduit employed in a furnace for heating corrosive fluids to elevated temperatures comprising an elongated silica roller-bearing member positioned in a tubular silica supporting column for restricted movement in slotted apertures therefor provided in said column, and a load distributing plate element disposed within said column and carried by said bearing member upon which plate member said fused silica conduit rests.

3. A support element enabling horizontal movement of a fused silica conduit employed in a furnace for heating a corrosive fluid to elevated temperatures comprising in combination an elongated silica roller-bearing member positioned for restricted rotary movement in slot openings of a tubular silica supporting column through which said conduit passes, and a load distributing plate member resting on said bearing member upon the upper surface of which plate member said fused silica conduit is supported.

ERNEST D. LEWIS.
RICHARD M. LUCKRING.

References Cited in the file of this patent
UNITED STATES PATENTS

| Number | Name | Date |
|---|---|---|
| 234,136 | Maxwell et al. | Nov. 9, 1880 |
| 271,482 | Liddell | Jan. 30, 1883 |
| 652,075 | Black | June 19, 1900 |
| 1,464,580 | Philipon | Aug. 14, 1923 |
| 1,515,352 | Mantle | Nov. 11, 1924 |
| 1,604,021 | Chamberlain | Oct. 19, 1926 |
| 1,645,762 | Lohbiller | Oct. 18, 1927 |
| 1,752,670 | Kingman | Apr. 1, 1930 |
| 1,768,869 | Uhlmann | July 1, 1930 |
| 1,878,593 | Meingast et al. | Sept. 20, 1932 |
| 1,901,922 | Mekler | Mar. 21, 1933 |
| 2,026,120 | Black | Dec. 31, 1935 |
| 2,230,221 | Fitch | Feb. 4, 1941 |
| 2,335,325 | Wainer | Nov. 30, 1943 |
| 2,472,497 | Stookey | June 7, 1949 |
| 2,476,152 | Levinson et al. | July 12, 1949 |
| 2,512,341 | Krehma | June 20, 1950 |